US009148636B1

(12) United States Patent
Alhazme (10) Patent No.: US 9,148,636 B1
(45) Date of Patent: Sep. 29, 2015

(54) MONITOR DEVICE, A METHOD FOR PROJECTING AN IMAGE ON A PROJECTION SCREEN AND A NON-TRANSITORY COMPUTER READABLE MEDIUM

(71) Applicant: Raed H. Alhazme, Florham Park, NJ (US)

(72) Inventor: Raed H. Alhazme, Florham Park, NJ (US)

( * ) Notice: Subject to any disclaimer, the term of this patent is extended or adjusted under 35 U.S.C. 154(b) by 26 days.

(21) Appl. No.: 14/203,038

(22) Filed: Mar. 10, 2014

(51) Int. Cl.
| | |
|---|---|
| *G03B 21/28* | (2006.01) |
| *H04N 9/31* | (2006.01) |
| *G03B 21/58* | (2014.01) |
| *G02B 27/00* | (2006.01) |
| *G06F 3/0484* | (2013.01) |
| *G03B 21/56* | (2006.01) |

(52) U.S. Cl.
CPC .......... *H04N 9/3185* (2013.01); *G02B 27/0006* (2013.01); *G03B 21/58* (2013.01); *G06F 3/04842* (2013.01); *G06F 3/04847* (2013.01); *G03B 21/56* (2013.01)

(58) Field of Classification Search
USPC ................. 353/79, 94, 121, 122, 72; 359/461
See application file for complete search history.

(56) References Cited

U.S. PATENT DOCUMENTS

| | | | | |
|---|---|---|---|---|
| 7,740,359 | B2 * | 6/2010 | Schnuckle et al. | 353/79 |
| 7,995,273 | B1 * | 8/2011 | Robinson | 359/449 |
| 8,267,524 | B2 * | 9/2012 | Morikuni | 353/48 |
| 8,313,199 | B2 * | 11/2012 | Hirata et al. | 353/94 |
| 2005/0185273 | A1 * | 8/2005 | Lee | 359/461 |
| 2012/0224314 | A1 | 9/2012 | Hinshaw et al. | |
| 2015/0109665 | A1 * | 4/2015 | Miggiano | 359/444 |

FOREIGN PATENT DOCUMENTS

| | | |
|---|---|---|
| CN | 2011-41978 | 10/2008 |
| JP | 2013-84269 | 5/2013 |
| WO | 00/28377 A1 | 5/2000 |
| WO | 2006/067640 A2 | 6/2006 |

* cited by examiner

*Primary Examiner* — William C Dowling
(74) *Attorney, Agent, or Firm* — Oblon, McClelland, Maier & Neustadt, L.L.P.

(57) ABSTRACT

A monitor device includes a projection screen that converts between an extended state and a retracted state, a supporter that supports the projection screen, a storage that stores the projection screen, a first and second projector that projects the image on the first and second side of the projection screen, a first and second user interface that receives an operation to control the image, a switcher that switches which of the first user interface or the second user interface has a control to control the image, a sensor that detects an object, a cleaner that cleans the projection screen, and circuitry that controls the projectors to output the image, corrects a shape of the image, controls the image based on the operation from the user interface with a control, and controls the image based on a detection by the sensor from a side of the screen with the control.

20 Claims, 11 Drawing Sheets

MONITOR DEVICE, A METHOD FOR PROJECTING AN IMAGE ON A PROJECTION SCREEN AND A NON-TRANSITORY COMPUTER READABLE MEDIUM

GRANT OF NON-EXCLUSIVE RIGHT

This application was prepared with financial support from the Saudia Arabian Cultural Mission, and in consideration therefore the present inventor(s) has granted The Kingdom of Saudi Arabia a non-exclusive right to practice the present invention.

BACKGROUND

In recent years, it has become common to use computers in workplace. However, monitors for computers can occupy a large space both vertically and horizontally, and sometimes interrupt a view even when they are not in use. In addition, conventional monitors only have a screen on one side, and thus the opposite side of the screen can be a dead space.

SUMMARY

The foregoing paragraphs have been provided by way of general introduction, and are not intended to limit the scope of the following claims. The described embodiments, together with further advantages, will be best understood by reference to the following detailed description taken in conjunction with the accompanying drawings.

Among other things, the present disclosure provides a monitor device includes a projection screen that converts between an extended state and a retracted state, a supporter that supports the projection screen, a storage that stores the projection screen, a first and second projector that projects the image on the first and second side of the projection screen, a first and second user interface that receives an operation to control the image from the first and second side of the projection screen, a switcher that switches which of the first user interface or the second user interface has a control to control the image, a sensor that detects an object, a cleaner that cleans the projection screen, and circuitry that controls the projectors to output the image, corrects a shape of the image, controls the image based on the operation from the user interface with a control, and controls the image based on a detection by the sensor from the first side of the projection screen when the first user interface has the control and from the second side of the projection screen when the second user interface has the control.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein:

FIG. 1 (*a*) is an exemplary front view of a monitor device in an extended state according to one embodiment;

FIG. 1 (*b*) is an exemplary lateral view of the monitor device in an extended state according to one embodiment;

FIG. 3 (*a*) is an exemplary front view of the monitor device in a retracted state according to one embodiment;

FIG. 3 (*b*) is an exemplary lateral view of the monitor device in a retracted state according to one embodiment;

FIG. 4 (*a*) is an exemplary front view of the monitor device in an intermediate state according to one embodiment;

FIG. 4 (*b*) is an exemplary lateral view of the monitor device in an intermediate state according to one embodiment;

DETAILED DESCRIPTION OF THE EMBODIMENTS

Figure 1:
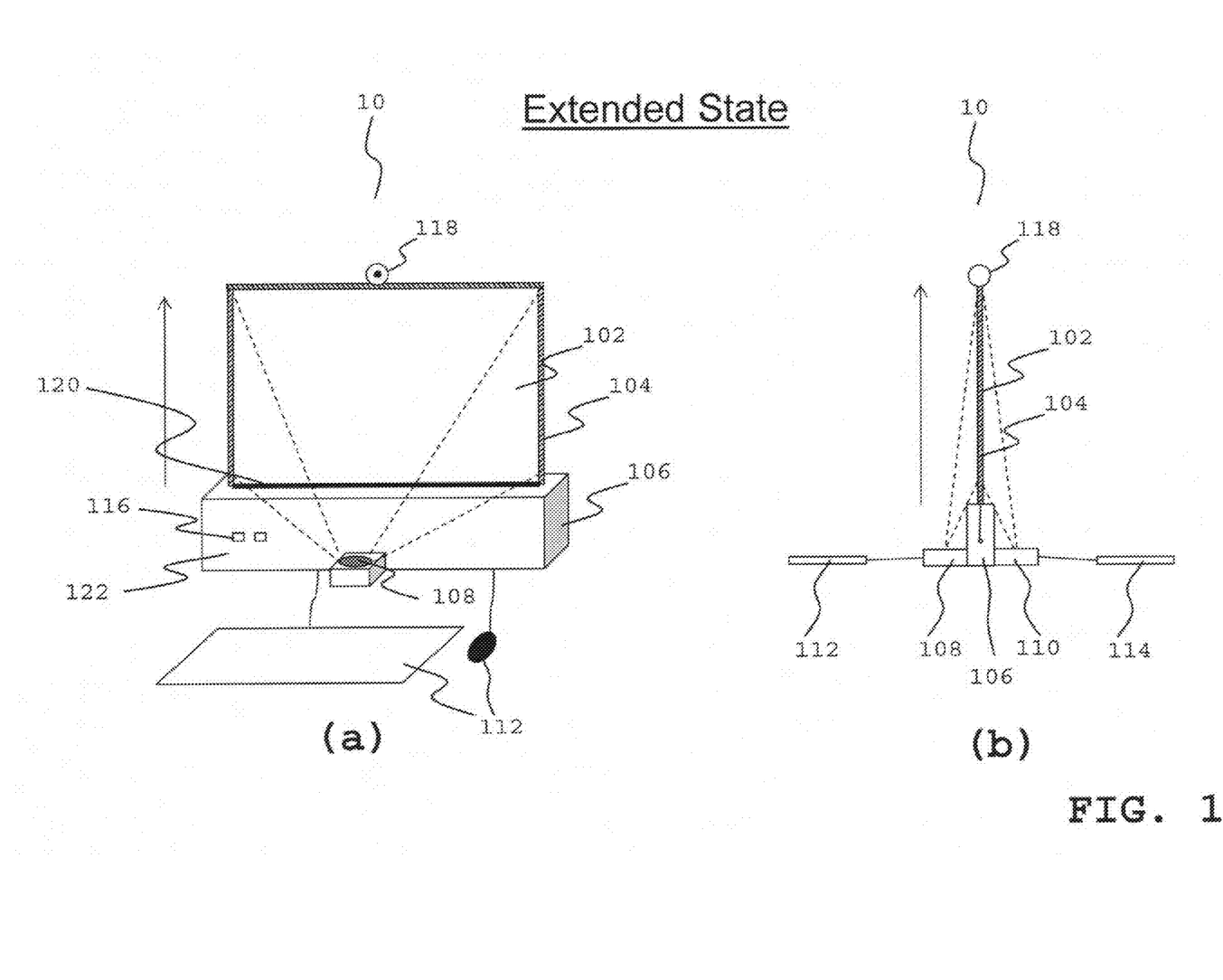

Referring now to the drawings, wherein like reference numerals designate identical or corresponding parts throughout the several views, FIG. 1 (*a*) is an exemplary front view of a monitor device in an extended state according to one embodiment, and FIG. 1 (*b*) is an exemplary lateral view of the monitor device in an extended state according to one embodiment. A monitor device 10 is a monitor device to monitor an image output from external computers (not shown), such as, a desktop computer, a laptop computer, a tablet computer, a mobile phone, a TV. The monitor device 10 itself may have a processing circuitry to process an image to be monitored on it. When a user uses the monitor device 10 to monitor an image, a projection screen 102 that is configured to display an image projected from a first projector 108 and a second projector 110 on the projection screen 102 by, for example, reflecting a light emitted from the projector 108 and 110 on the surface of the projection screen 102 is taken out of a storage 106, and the projection screen 102 is extended substantially flat vertically. The storage 106 is a storage that stores the projection screen 102 when the projection screen 102 is in a retracted state. A user may manually take the projection screen 102 out of the storage 106 or operate the monitor device so that the projection screen 102 is automatically extended out of the storage by an actuator, such as a motor.

Supporter 104 supports the projection screen 102, for example, from two sides of a rectangle shape of the projection screen 102 so that the projection screen 102 extends substantially flat vertically when the projection screen 102 is in the extended state. It is preferable that the material of the supporter 104 has a high elasticity and a high strength property in order to support the projection screen 102 to extend substantially flat when the projection screen 102 is in the extended state, and at the same time to be rolled up when the projection screen 102 is in the retracted state. The material of the supporter 104 may be, such as, a fiberglass with a high elasticity and strength with a property to be straight when no force is added. The supporter 104 may be retractable supporting rails composed of a plurality of rails that overlap with each other when the monitor device is in the retracted state and extend straight with less overlap when the projection screen 102 is in the extended state.

The first projector 108 and the second projector 110 are projectors that projects image on the projection screen 102. The first projector 108 is located so that the image projected from the first projector 108 is projected on a first side of the projection screen 102, and the second projector 110 is located so that the image projected from the second projector 110 is projected on a second side of the projection screen 102 that is an opposite side of the first side of the projection screen 102. For example, the first projector 108 and the second projector 110 are located on opposite sides of the storage 106 near center positions of the long sides of the rectangle shaped storage 106.

First user interface 112 and second user interface 114 are user interfaces, such as a keyboard, a mouse, or a touch panel, to receive an operation to control the image displayed on the projection screen 102 so that more than two users may operate the image from both sides of the projection screen 102. For example, a user may change the image, move a pointer displayed on the image, or forward a slide to a next slide from the first user interface 112 and the second user interface 114.

Switcher 116 is a switcher to switch which of the first user interface 112 or the second user interface 114 has a control to control the image displayed on the projection screen 102. When a control is assigned to the first user interface 112 by the switcher 116, only from the first user interface 112 can the image be controlled, and the image cannot be controlled from the second user interface 114. The switcher 116 may be one or more physical button(s) to choose which of the first user interface 112 or the second user interface 114 has a control to control the image. The switcher 116 may be a software interface displayed as an image on the projection screen 102 to choose which of the first user interface 112 or the second user interface 114 has a control to control the image. The switcher 116 may be configured so that both of the first user interface 112 and the second user interface 114 has a control to control the image in addition to either one of the first user interface 112 or the second user interface 114 has a control.

Figure 2:
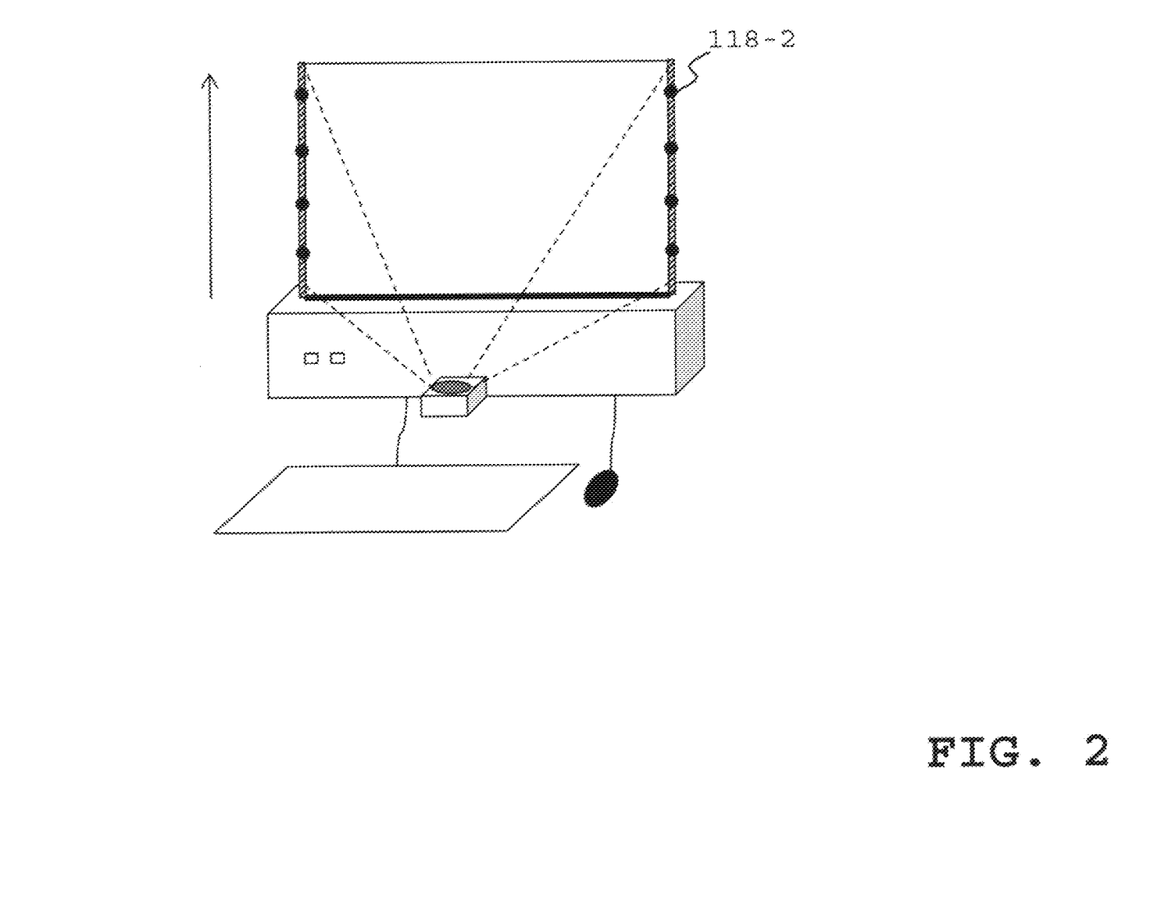
FIG. 2 is an another exemplary front view of the monitor device in an extended state according to one embodiment.

Sensor 118 is a sensor, such as a camera, an infrared ray sensor, or a directional microphone, that detects an object around the monitor device 10, such as a gesture in front of the monitor device 10, a touch on the projection screen, a face of a user in front of the monitor device. For example, based on the detection by the sensor 118, a user may control the image to be displayed, or control the switcher 116. The sensor 118 may be attached at the center top of the projection screen 102. In another example, as shown in FIG. 2, plurality of the sensor 118 may be attached at the short sides and/or top long side of the rectangle shaped projection screen 102 with a certain distance to detect which area of the projection screen 102 is touched by a user.

Cleaner 120 is a cleaner that cleans the projection screen 102 when the projection screen 102 converts between the extended state and the retracted state. For example, the cleaner 120 is an antiseptic material located at an outlet of the storage 106 so that the antiseptic material contacts a surface of the projection screen when the projection screen 102 converts between the extended state and the retracted state. The cleaner 120 may be a brush that spins automatically by an actuator when the projection screen 102 converts between the extended state and the retracted state. This cleaner 120 is especially beneficial for use in an environment that requires a constant sterilization of an equipment in the area, such as an operating room in a hospital.

The monitor device 10 includes circuitry 122 inside. For example, the circuitry 122 may process the image data input to the circuitry 122 and control the first projector 108 and the second projector 110 to project the processed image data. The circuitry 122 may correct a shape of the image that is projected from the first projector 108 and the second projector 110 so that the image is projected on the projection screen 102 squarely by adjusting the light output from the first projector 108 and the second projector 110 or by adjusting the image data. In addition, the circuitry 122 may control the image to be displayed based on an operation from the first user interface 112 when a control is assigned to the first user interface 112 or the second user interface 114 when a control is assigned to the second user interface 114. Therefore, the circuitry 122 ignores the operation from the user interface 112 or 114 when the control is not assigned to it, or controls the image to display an alert message, such as, "user operation prohibited!" so that a user can understand that a user operation is prohibited. The circuitry 122 may control the image based on the operation from the user interface 112 and 114 by itself, or the circuitry may transmit the operation to the external computer and receive the image after the operation is conducted at the external computer.

Figure 3:
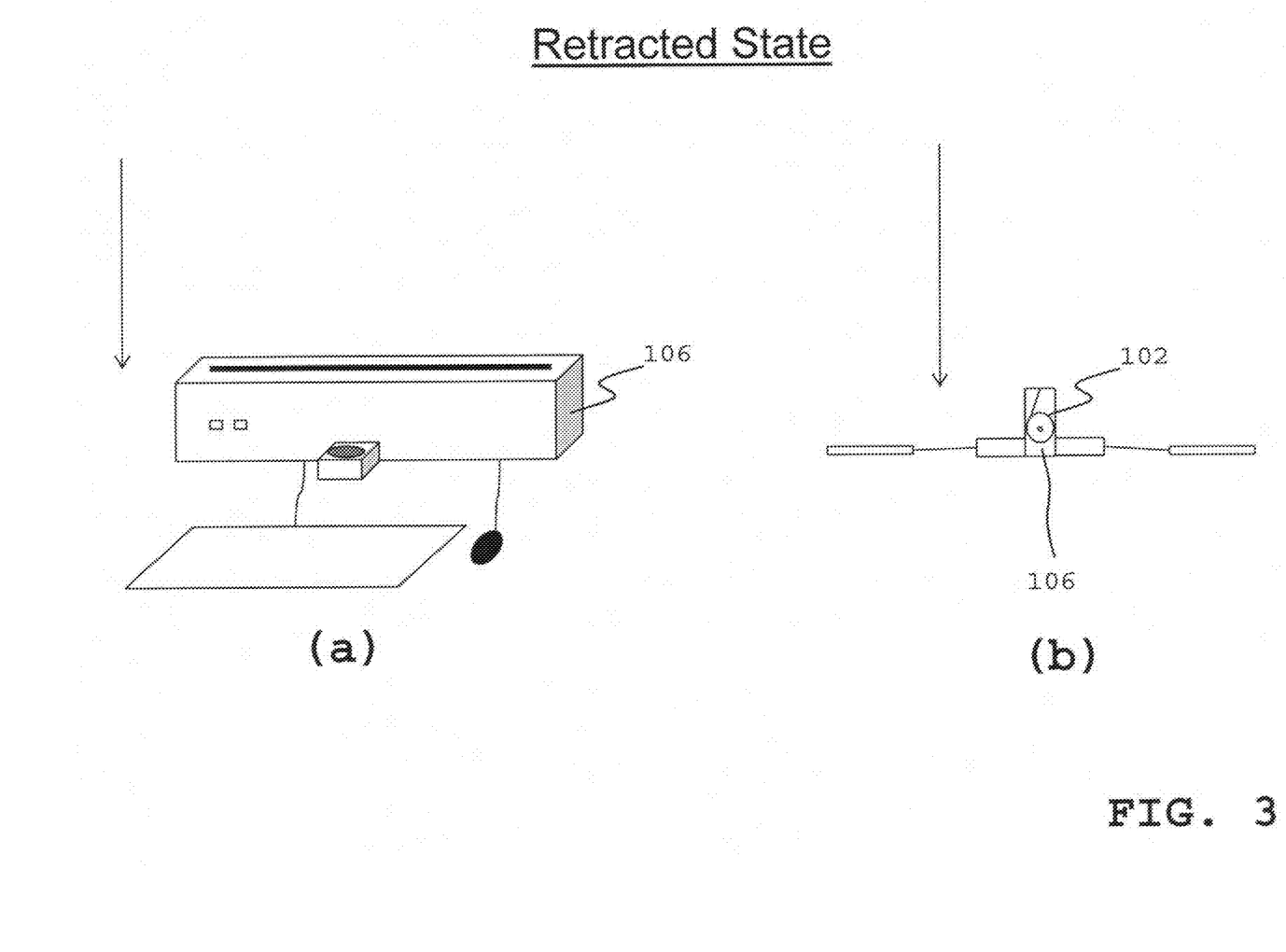

FIG. 3 (a) is an exemplary front view of the monitor device in a retracted state according to one embodiment, and FIG. 3 (b) is an exemplary lateral view of the monitor device in a retracted state according to one embodiment. In the retracted state, the projection screen 102 is retracted by being rolled up and stored in the storage 106. The projection screen 102 may be retracted in different ways. For example, the projection screen 102 may be stored in the storage 106 that is installed under the monitor device 10 by being moved downward without being rolled up, or the projection screen 102 may be folded several times in the storage 106.

Figure 4:
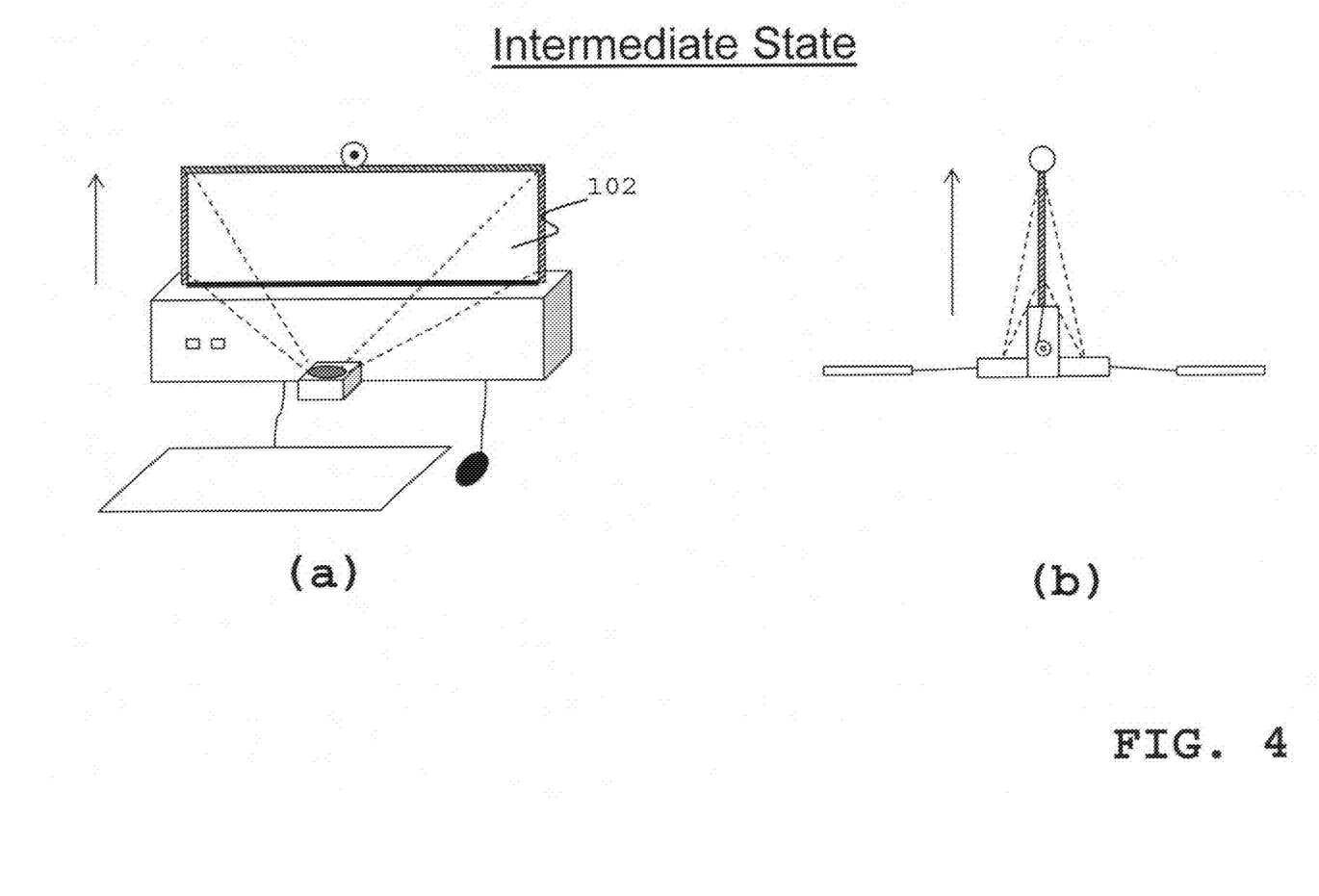

FIG. 4 (a) is an exemplary front view of the monitor device in an intermediate state according to one embodiment, and FIG. 4 (b) is an exemplary lateral view of the monitor device in an intermediate state according to one embodiment. For example, in a situation where a user does not want to use the entire space of the projection screen 102, a user may extend the projection screen 102 out of the storage 106 to the extent the user wishes. In another example, the circuitry 122 judges an aspect ratio (e.g., 16:9, 3:2) of the input image data and control the actuator to extend the projection screen 102 out of the storage 106 so that the image projected from the first projector 108 and the second projector 110 occupies substantially entire area of the projection screen 102 extended out of the storage 106 regardless of the aspect ratio of the input image data.

Figure 5:
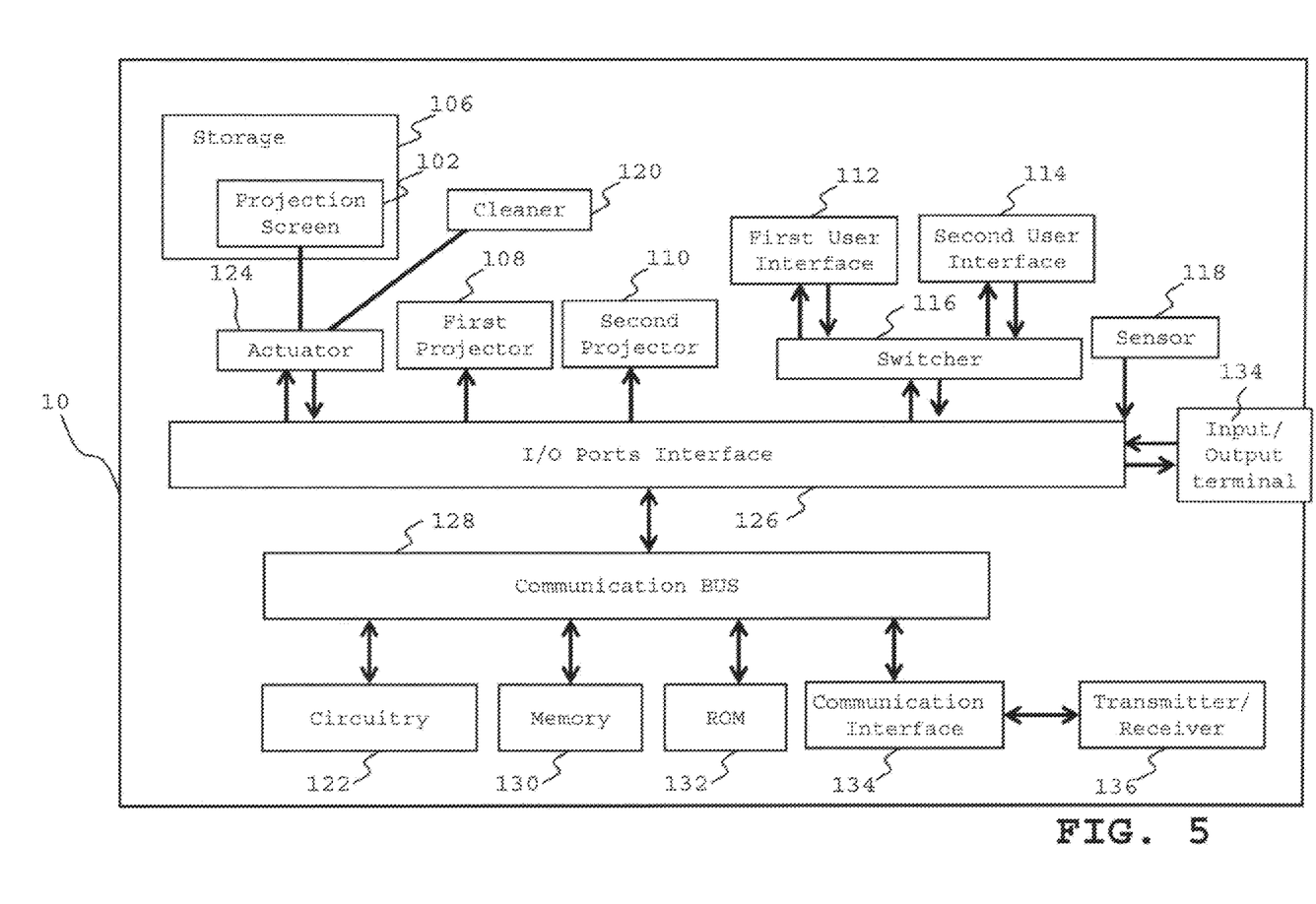
FIG. 5 is an exemplary block diagram of the monitor device according to one embodiment.

FIG. 5 is an exemplary block diagram of the monitor device according to one embodiment. The monitor device 10 includes an I/O ports interface 126 that is connected to the actuator 124, the first project 108, the second projector 110, the switcher 116, the sensor 118 and an input/output terminal 134, and exchange data with these devices. The actuator 124 is connected to the projection screen 102 and cleaner 120, and based on the instruction from the circuitry 122, the first user interface 112 or the second user interface 114, the actuator 124 move the projection screen 102 or the drive the cleaner 120 (e.g., rotate a blush). Depending on which of the first user interface 112, the second user interface 114, or the both of the first user interface 112 and the second user interface 114 the control is assigned, the switcher 116 selectively receives the operation from the first and/or second user interface. The data detected by the sensor 118 is transmitted to the circuitry 122 through the I/O ports interface 126 and a communication BUS 128 so that the circuitry 122 may operate based on the detection by the sensor 118. Through the input/output terminal 134, image data or instruction data from the external computers (e.g., a desktop computer, a laptop computer, a tablet computer, a mobile phone, a TV) or a storage device (e.g., memory device) is transmitted to the I/O ports interface 126. The image data input from the input/output terminal 134 may be transmitted directly to the first projector 108 and the second projector 110, or transmitted to the circuitry 122 and processed by the circuitry 122 to be projected by the first projector 108 and the second projector 110.

The I/O ports interface 126 may include logic to interpret the device address generated by circuitry 122. The I/O ports interface 126 may also include a hand-shaking logic so that the circuitry 122 can communicate with the actuator 124, the first project 108, the second projector 110, the switcher 116, the sensor 118 and an input/output terminal 134 through the I/O ports interface 126. The I/O ports interface 126 is also connected to communication BUS 128. The communication BUS 128 is also connected to the circuitry 122, a memory 130, and ROM 132 and communication interface 134. The communication BUS 128 stores information and instructions to be executed by the circuitry 122 and manages the signal transaction between each component in the monitor device 10. The communication BUS 128 may include a data BUS to carry information, an address BUS to determine where the information should be sent and a control BUS to determine its operation.

The circuitry 122, such as a processing circuitry or a CPU, executes one or more sequences of one or more instructions contained in a memory, such as memory 130. Such instructions may be read into the memory 130 from another computer readable medium, such as a hard disk or removable media drive. One or more processors in a multi-processing arrangement may also be employed to execute the sequences of instructions contained in memory 130. In alternative embodiments, hard-wired circuitry may be used in place of or in combination with software instructions. Thus, embodiments are not limited to any specific combination of hardware circuitry and software.

As stated above, the monitor device 10 includes at least one computer readable medium or memory, such as memory 130, for holding instructions programmed according to the teachings of the present disclosure and for containing data structures, tables, records, or other data described herein. Examples of non-transitory storage device are compact discs, hard disks, floppy disks, tape, magneto-optical disks, PROMs (EPROM, EEPROM, flash EPROM), DRAM, SRAM, SDRAM, or any other magnetic medium, compact discs (e.g., CD-ROM), or any other optical medium, punch cards, paper tape, or other physical medium with patterns of holes, a carrier wave, or any other medium from which a computer can read.

Stored on any one or on a combination of computer readable medium, the present disclosure includes software for controlling the monitor device 10. Such software may include, but is not limited to, device drivers, operating systems, development tools, and applications software. Such computer readable medium further includes the computer program product of the present disclosure for performing all or a portion (if processing is distributed) of the processing performed in implementing the disclosure.

The computer code devices of the present disclosure may be any interpretable or executable code mechanism, including but not limited to scripts, interpretable programs, dynamic link libraries (DLLs), Java classes, and complete executable programs. Moreover, parts of the processing of the present disclosure may be distributed for better performance, reliability, and/or cost.

The term "computer readable medium" as used herein refers to any non-transitory or transitory medium that participates in providing instructions to the circuitry 122 for execution. A computer readable medium may take many forms, including but not limited to, non-volatile media, volatile media, and transmission media. Non-volatile media includes, for example, optical magnetic disks, and magneto-optical disks, such as the hard disk or the removable media drive. Volatile media includes dynamic memory, such as the memory 130. Transmission media includes coaxial cables, copper wire and fiber optics, including the wires that make up the communication bus 128. Transmission media may also take the form of acoustic or light waves, such as those generated during radio wave and infrared data communications.

Various forms of computer readable media may be involved in carrying out one or more sequences of one or more instructions to circuitry 122 for execution. For example, the instructions may initially be carried on a magnetic disk of a remote computer. The remote computer can load the instructions for implementing all or a portion of the present disclosure remotely into a dynamic memory and send the instructions over a telephone line using a modem. A modem local to the monitor device 10 may receive the data on the phone line and use an infrared transmitter to convert the data to an infrared signal. An infrared detector coupled to the communication bus 128 can receive the data carried in the infrared signal and place the data on the communication bus 128. The communication bus 128 carries data to the memory 130, from which the circuitry 122 retrieves and executes the instructions. The instructions received by the memory 130 may optionally be stored on storage device either before or after execution by circuitry 122.

Memory 130 is any non-transitory storage device such as compact discs, hard disks, floppy disks, tape, magneto-optical disks, PROMs (EPROM, EEPROM, flash EPROM), random access memory (RAM), DRAM, SRAM, SDRAM, or any other magnetic medium, compact discs (e.g., CD-ROM), or any other optical medium, punch cards, paper tape, or other physical medium with patterns of holes, a carrier wave, or any other medium from which a computer can read and coupled to the communication bus 128 for storing information and instructions by the circuitry 122. In addition, the memory 130 may be used for storing temporary variables or other intermediate information during the execution of instructions by the circuitry 122.

The monitor device 10 further includes a read only memory (ROM) 132 or other static storage device (e.g., programmable ROM (PROM), erasable PROM (EPROM), and electrically erasable PRM (EEPROM)) coupled to the communication bus 128 for storing static information and instructions for the circuitry 122.

The monitor device 10 may also include a communication interface 134 coupled to the communication BUS 128. The communication interface 134 provides a two-way data communication coupling to a network link that is connected to, for example, wireless communication network (e.g., cellular networks or wireless LAN). In any such implementation, the communication interface 134 sends and/or receives electrical, electromagnetic or optical signals that carry digital data streams representing various types of information. The communication interface 134 may be further connected to a transmitter/receiver 136 including a transmitter and a receiver.

The network link typically provides data communication through one or more networks to other data devices. The monitor device 10 may transmit and/or receive data, including program code, through the network(s), the network link, the transmitter/receiver 136 and the communication interface 134. The circuitry 122 may control the transmitter/receiver 136 to transmit information obtained by the first user interface 112 or the second user interface 114 to the other computers through the network. The circuitry 122 may control the transmitter/receiver 136 to receive information (e.g., image data to be displayed) from other computers through the network and control the first projector 108 and the second projector 110 to project the received image.

Figure 6:
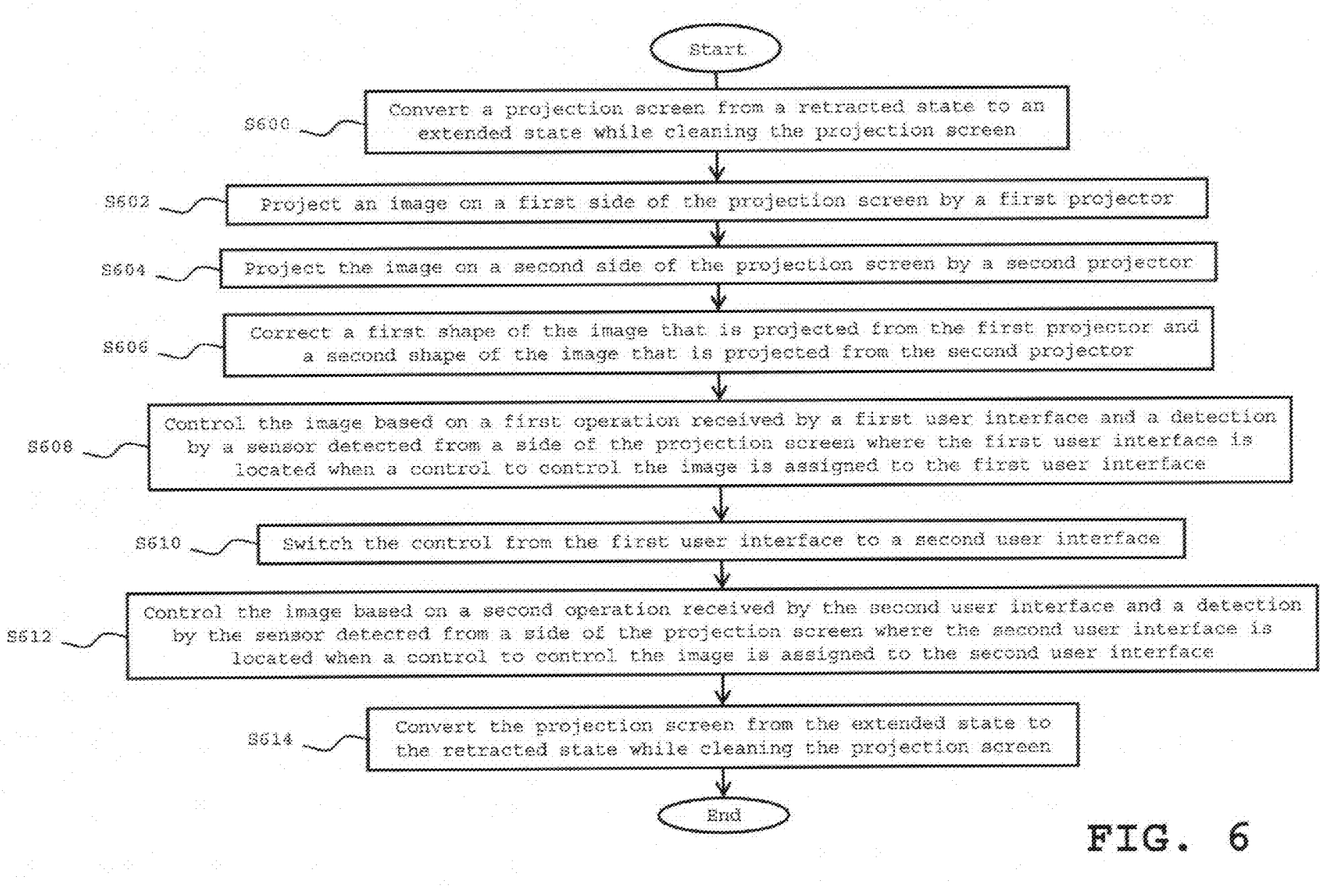
FIG. 6 is an exemplary flowchart of the monitor device according to one embodiment.

FIG. 6 is an exemplary flowchart of the monitor device according to one embodiment. At step 600, a projection screen 102 is converted from the retracted state to the extended state while cleaning the projection screen 102. This step may be conducted manually by a user (e.g., by a hand). This step may be conducted using an actuator 124 (e.g., motor) based on an instruction from the circuitry 122 after, for example, a user pushes the power button of the monitor device 10 to turn on. The monitor device 10 may memorize how much the projection screen 102 was extended out of the storage 106 last time the user used the monitor device 10, or memorize the preferable position(s) of the projection screen 102 the user preregistered in the memory 130 so that the projection screen 102 is automatically extended out of the storage 106 to the preferable position by the actuator 124 when the power button is pushed by the user.

An antiseptic material may be located at an outlet of the storage 106 so that the antiseptic material contacts a surface of the projection screen 102 when the projection screen 102 converts between the extended state and the retracted state. In another example, the sensor 118 may detect a contamination on the surface of the projection screen 102 and the circuitry may control the actuator 124 to drive the cleaner 120 to clean the surface of the projection screen 102 based on how much the projection screen 102 is contaminated.

Upon receipt of an instruction by a user to project an image from the first user interface 112 or the second user interface 114 that has a control, the circuitry 122 controls the first projector 108 to project the image on a first side of the projection screen 102 at step 602, and the second projector 110 to project the image on a second side of the projection screen 102 at step 604.

At step 606, the circuitry 122 corrects the first shape of the image that is projected from the first projector 108 and the second shape of the image that is projected from the second projector 110. This correction is conducted by correcting data of the image input to the first projector and the second projector, or by controlling the first projector and the second projector to correct the image projected from the first projector and the second projector. In another example, the sensor 118 detects a first position of the first projector 108 and a second position the second projector 110, and the circuitry 122 corrects the first shape of the image based on the first position and the second shape of the image based on the second position. In order for the sensor 108 to easily detect the position of the first projector 108 and the second projector 110, shape information of the first projector 108 and the second projector 110 may be stored in the memory 130 beforehand, or a maker may be attached to the first projector 108 and the second projector 110. The memory 130 may store an information table that includes a relationship of a shape of the projector 108/110 or the marker recognized by the sensor 118, and the shape, light angle, and/or strength of the image projected from the projector 108/110 or modification on the image data. In this way, no matter where a user may put the projector 108/110, the circuitry may automatically correct the shape, light angle, and/or strength of the image that is projected from the projector 108/110 or the image data so that the image is projected on both sides of the projection screen 102 substantially squarely.

At step 608, the circuitry 122 controls the image based on a first operation received by a first user interface 112 and a detection by a sensor 118 detected from a side of the projection screen 102 where the first user interface 112 is located when a control to control the image is assigned to the first user interface 112. For example, when the first user interface 112 has a control to control the image, based on the input by a user from the first user interface 112 (e.g., mouse) to move a pointer displayed on the image, or forward a slide to the next slide, the circuitry 122 controls the image to be projected from the first projector 108 and the second projector 110. In another example, when the first user interface 112 has a control to control the image, based on a touch on the projection screen 102, or a gesture in front of the projection screen 102 (e.g., wave a hand) from a side of the projection screen 102 where the first user interface 112 is located, the circuitry 122 controls the image to be projected from the first projector 108 and the second projector 110. In addition, a user may preregister which of the first user interface 112 or the second user interface 114 or the both has a control beforehand as a default setting.

At step 610, based on an input by a user to switch the control (e.g., pushing the physical switching button 116 or selecting a software switching interface 116 displayed as an image on the projection screen 102), the circuitry 122 switches the control to control the image from the first user interface to the second user interface. The user may also switch the control by touching a predetermined area of the projection screen 102 or doing a predetermined gesture (e.g. wave a hand twice), and based on the detection of the touching or the gesture by the sensor 118, the circuitry 122 may control the switcher to switch the control. This touching or gesture to switch the control may be done only from the side that has a control. In another example, the circuitry 122 may control the switcher 116 to assign the control to either the first user interface 112 or the second user interface 114 in front of which a certain face that is preregistered to the memory 130 of the monitor device 10 is recognized by the sensor 118 by using a face recognition technology. In this way, on whichever side of the projection screen 102 a user may sit, as long as the user is a preregistered user who preregistered his/her face to the monitor device 10 beforehand, the control is automatically assigned to the user without any procedures to change the control.

At step 612, the circuitry 122 controls the image based on a second operation received by the second user interface 114 and a detection by a sensor 118 detected from a side of the projection screen 102 where the second user interface 114 is located when a control to control the image is assigned to the second user interface 114.

At step 614, a projection screen 102 is converted from the extended state to the retracted state while cleaning the projection screen 102. This step may be conducted manually by a user (e.g., by a hand). This step may be conducted using an actuator 124 (e.g., motor) based on an instruction from the circuitry 122 after, for example, a user pushes the power button of the monitor device 10 to shut down.

Figure 7:
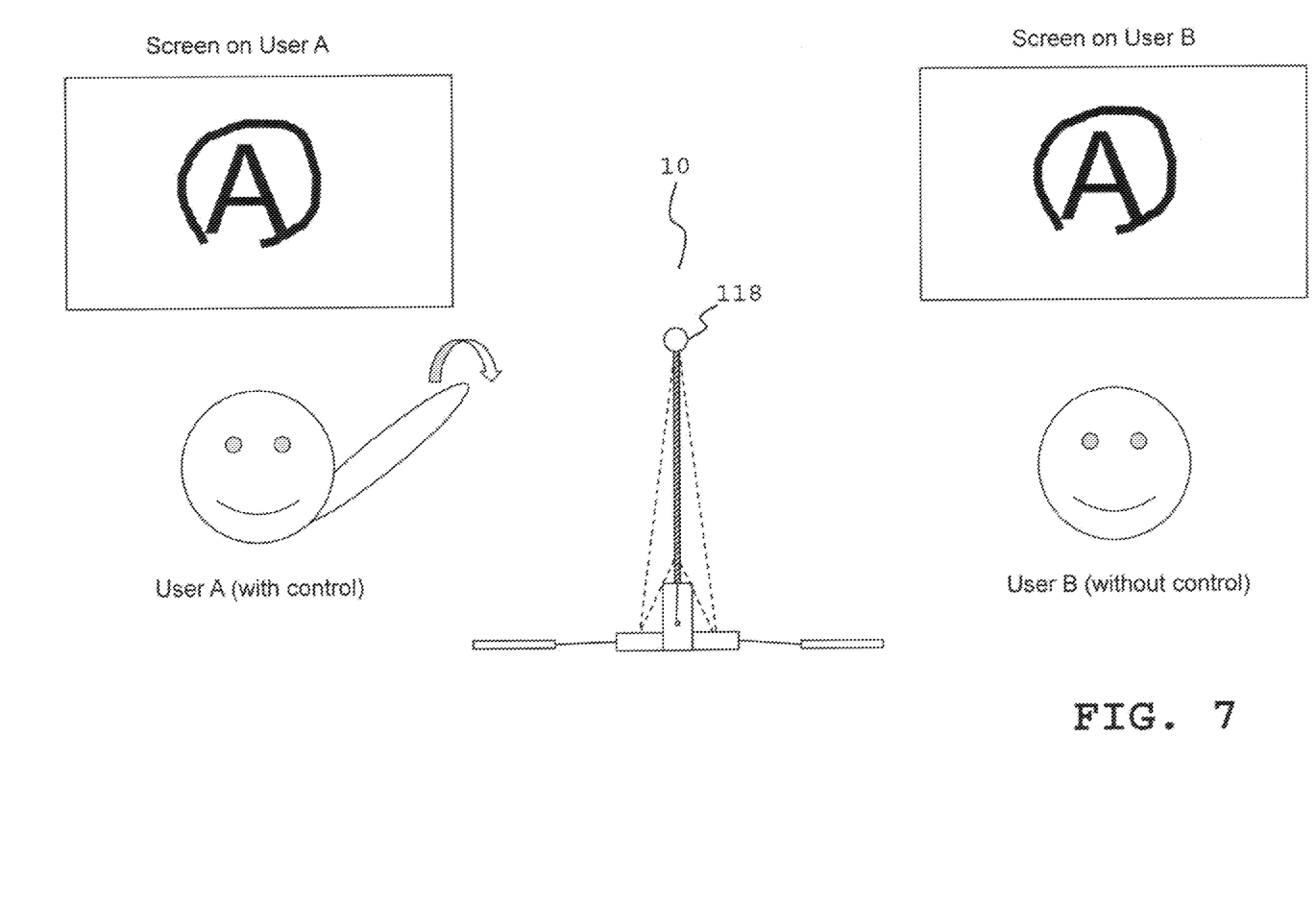
FIG. 7 is exemplary images on a first side and a second side of a projection screen according to one embodiment.

FIG. 7 is exemplary images on a first side and a second side of a projection screen according to one embodiment. A "user A" who has a control to control the image can control the image by, for example a gesture detected by the sensor 118. For example, the user A may circle the word "A" displayed on the projection screen 102 by a gesture, and this added circle is shared between the user A and a user B who does not have a control sitting on the opposite side of the projection screen 102. In this way, user A and B can share the information smoothly even though they are looking at opposite sides of the projection screen 102.

Figure 8:
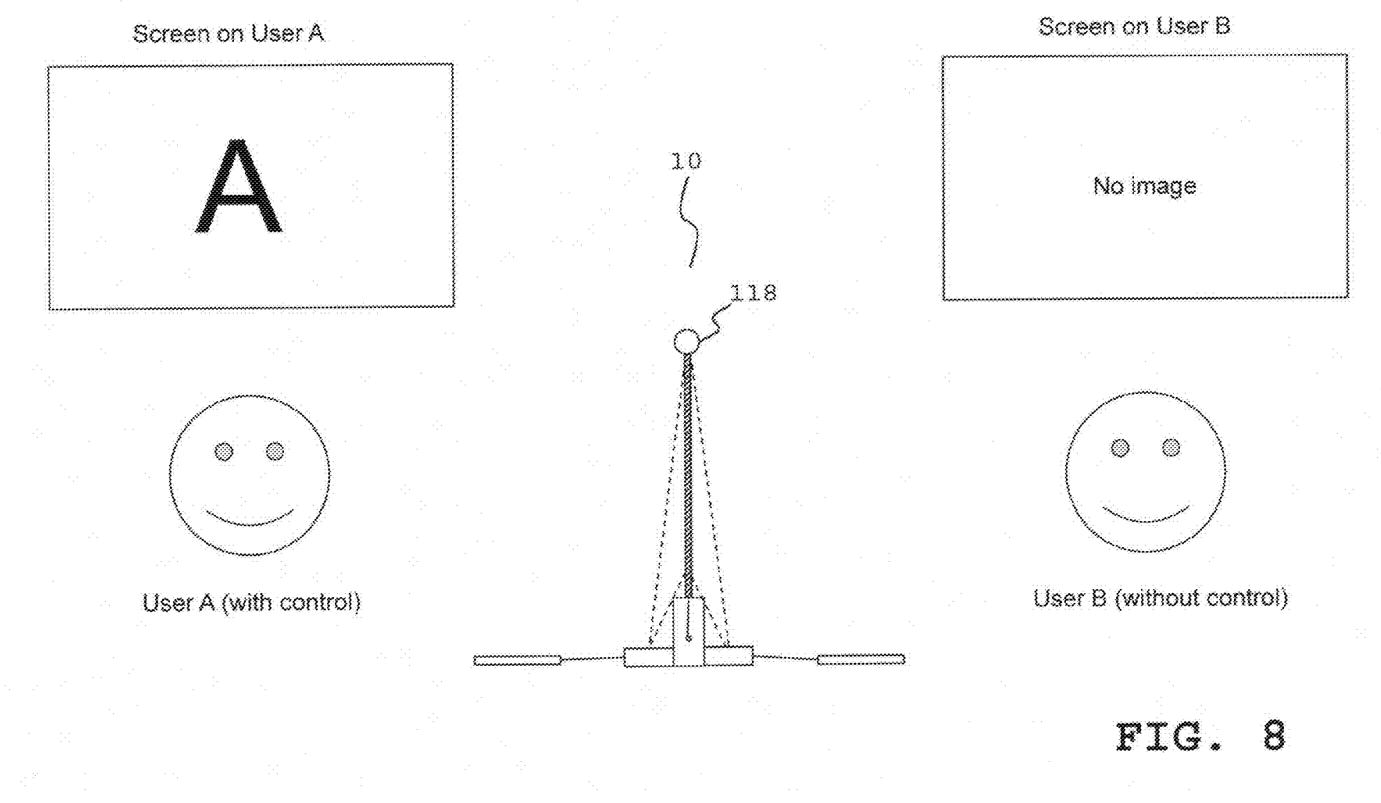
FIG. 8 is another exemplary images on a first side and a second side of a projection screen according to one embodiment.

FIG. 8 is another exemplary images on a first side and a second side of a projection screen according to one embodiment. Contrary to the situation in FIG. 7, there is a situation where a user does not want to share the image with another user sitting on the opposite side of the projection screen 102. In this case, the circuitry 122 controls the second projector 110 to stop projecting the image based on the first operation received by the first user interface 112 when the first user interface 112 has a control. For example, a user A who has a control may instruct the monitor device 10 not to project the image from the second projector 110 by an operation from the first user interface 112 or a certain gesture detected by the sensor 118 so that the user A may stop sharing the image with a user B. In this case, the second projector 110 may stop projecting the image by stopping projecting light, or displaying a certain alert message, such as "image blocked by user A" so that a user B can understand that the image is now being blocked by the user A.

Figure 9:
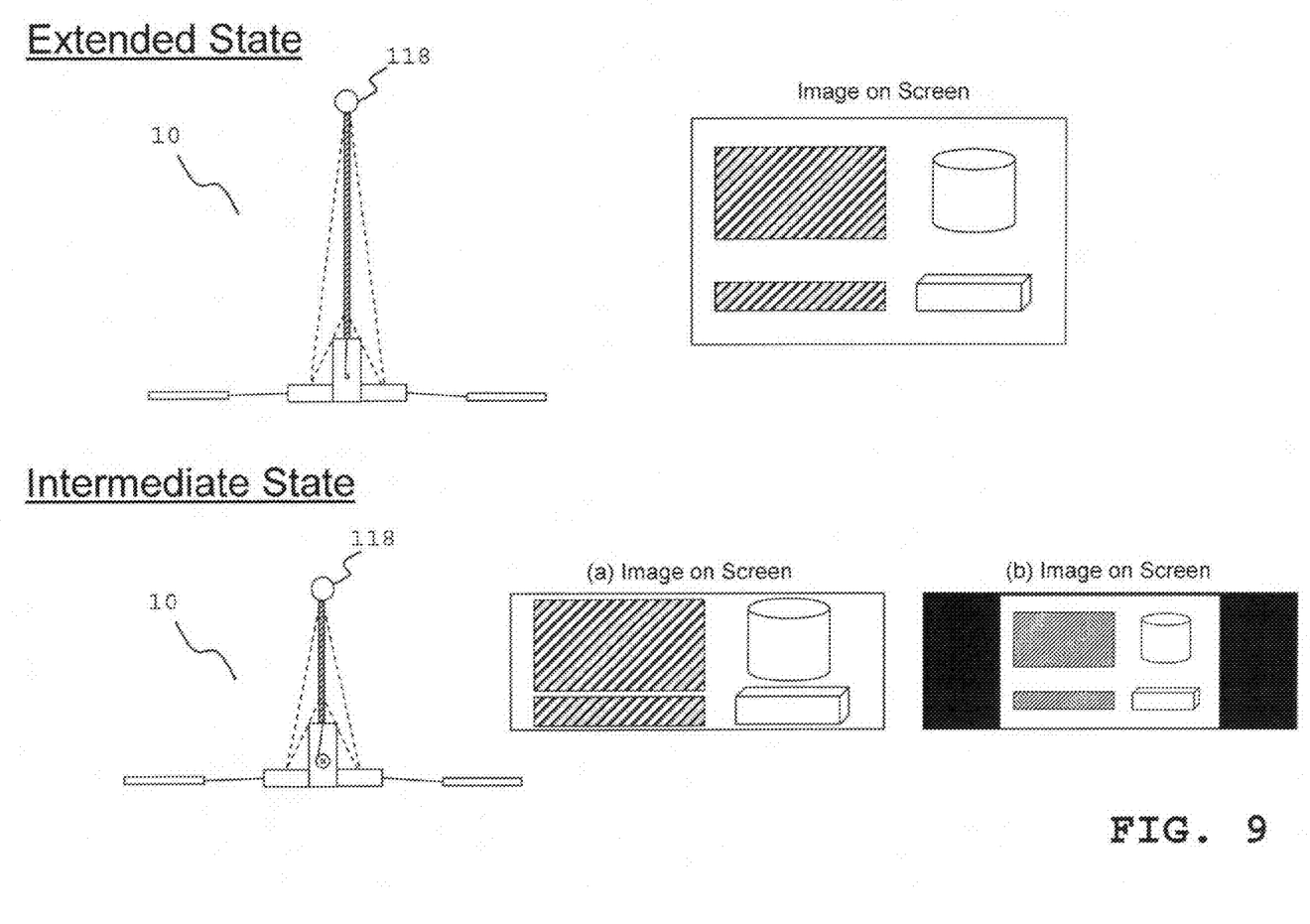
FIG. 9 is exemplary images on a projection screen in an extended state and an intermediate state according to one embodiment.

FIG. 9 is exemplary images on a projection screen in an extended state and an intermediate state according to one embodiment. There is a situation where a user does not want to use a whole area of the projection screen 102 (e.g., a user does not want to block the view by the projection screen 102). In this case, a user may extend the projection screen 102 out of the storage 106 to the extent he/she wishes (see "intermediate state" of FIG. 9). In the intermediate state, the sensor 118 detects how much the projection screen 102 is extended out of the storage 106. This may be done by detecting how much portion of the projection screen 102 is left in the storage 106 or detecting how much portion of the projection screen 102 is out of the storage 106. Then, the circuitry 122 adjusts the image data to be displayed on the projection screen 102 based on an input from the sensor 118 so that the image can be displayed in an area of the projection screen 102 being extended out of the storage 106 (see "(a) Image on Screen"). In another example, the circuitry 122 controls the first projector 108 and the second projector 110 (see "(b) Image on Screen") based on an input from the sensor 118 so that the image can be displayed in an area of the projection screen 102 being extended out of the storage 106 without adjusting the image data itself.

Figure 10:
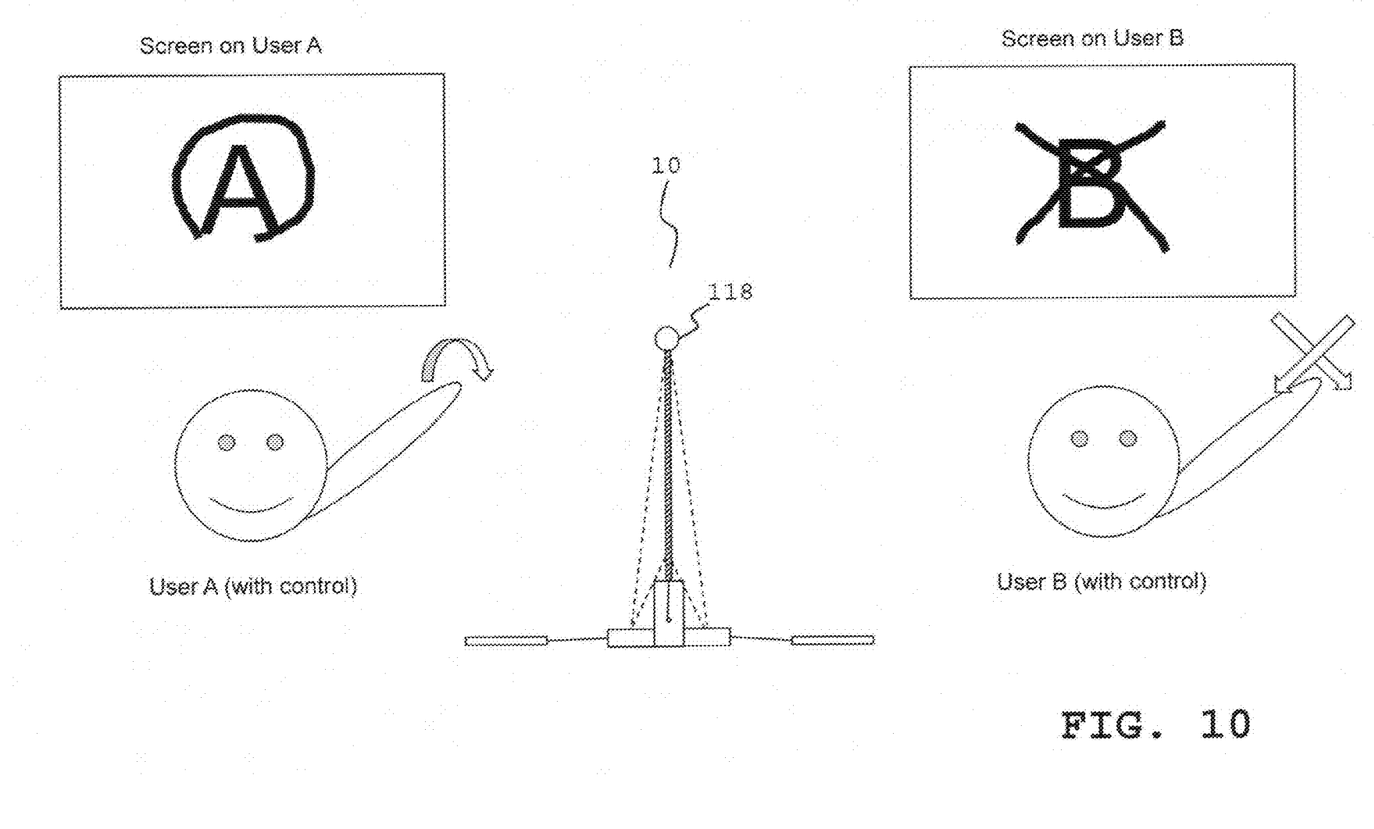
FIG. 10 is another exemplary images on a first side and a second side of a projection screen according to one embodiment.

FIG. 10 is another exemplary images on a first side and a second side of a projection screen according to one embodiment. There is a situation where more than one users want to project different images on either side of the projection screen 102 and control the image individually. In this case, a user may instruct the monitor device 10 from either the first user interface 112 or the second user interface 114 whichever has a control, to switch the switcher 116 to assign the control to both of the first user interface 112 and the second user interface 114. In this way, both of the user A and user B are assigned a control, and user A and user B can control each images individually (e.g., user A can circle the word "A" displayed on user A side, and user B can add X on the word "B" displayed on user B side). In another example, when a user with a control requests from the user interface to display a first image from the first projector 108 and a second image, which is different from the second image, from the second projector 110, the circuitry may automatically assign the control to both the first user interface 112 and the second user interface 114.

Figure 11:
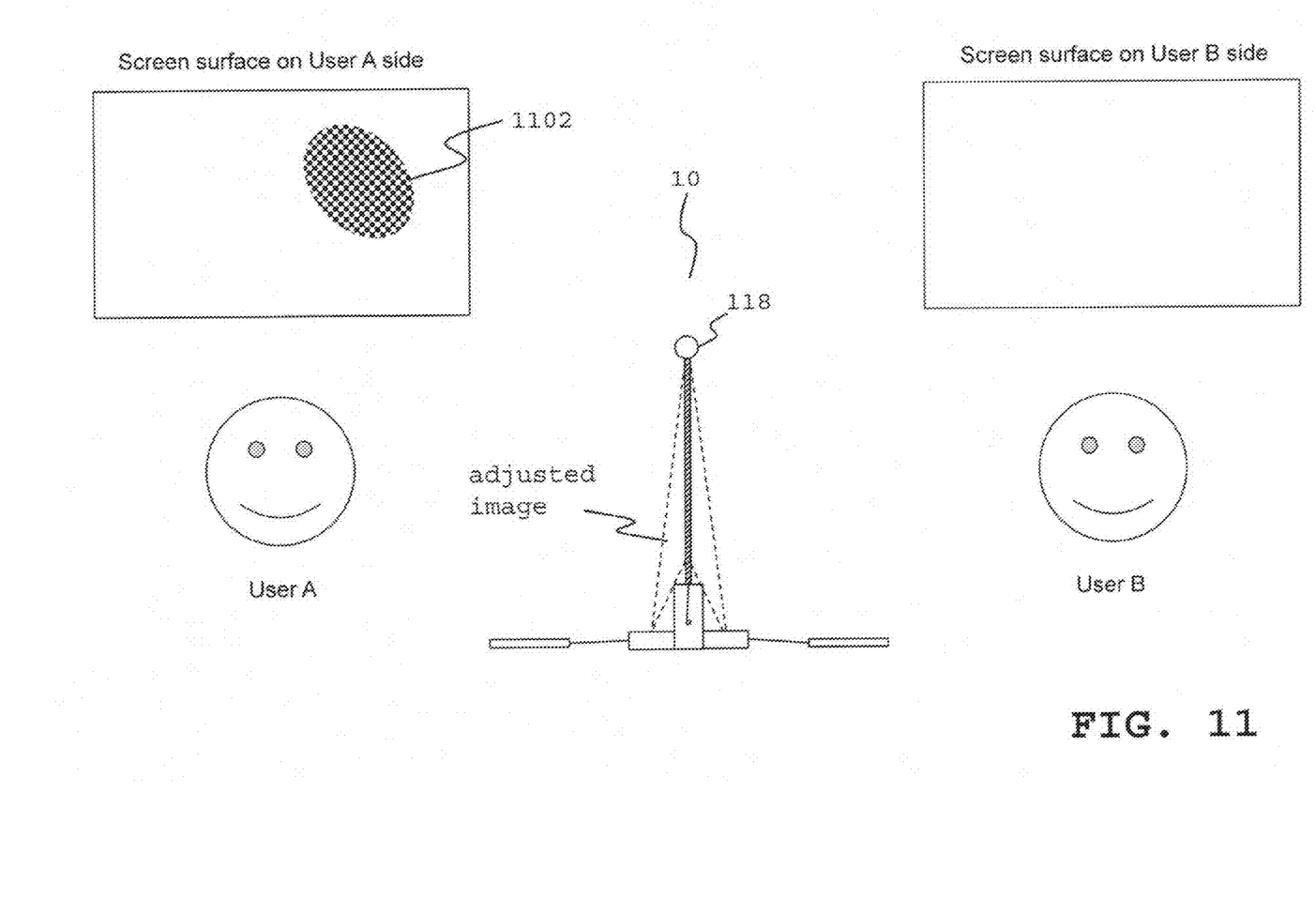
FIG. 11 is exemplary screen surfaces on a first side and a second side of a projection screen according to one embodiment.

FIG. 11 is exemplary screen surfaces on a first side and a second side of a projection screen according to one embodiment. The projection screen 102 can be contaminated through time. In this case, the sensor 118 may detect a contamination 1102 on both of the first side and the second side of the projection screen 102, and then the circuitry 122 may control the first projector 108 to output a first image and the second projector 110 to output a second image based on the contamination detected by the sensor 118 so that the first image on the first side of the projection screen 102 and the second image on the second side of the projection screen are 102 close with each other. For example, a user A with a control requests to project an "image A", and there is a contamination 1102 on the user A side of the projection screen 102. Then, the circuitry 122 modifies the image data of "image A" to "image B" (e.g., modify the area corresponding to the contaminated area of the screen brighter), or control the first projector 108 to modify the light (e.g., make the emitted light brighter) so that the image B displayed on the contaminated screen is close to the image A displayed on the non-contaminated screen by compensating for the contamination 1102.

The monitor device according to the selected embodiments helps a user to conserve space for a monitor by retracting a projection screen in a storage when the screen is not in use, and also helps the user to share a image with another user by projecting the image on both sides of the screen while conserving space.

Any processes, descriptions or blocks in flow charts should be understood as representing modules, segments, portions of code which include one or more executable instructions for implementing specific logical functions or steps in the process, and alternate implementations are included within the scope of the exemplary embodiment of the present system in which functions may be executed out of order from that shown or discussed, including substantially concurrently or in reverse order, depending upon the functionality involved, as would be understood by those skilled in the art. Further, it is understood that any of these processes may be implemented as computer-readable instructions stored on computer-readable media for execution by a processor.

Obviously, numerous modifications and variations of the present system are possible in light of the above teachings. It is therefore to be understood that within the scope of the appended claims, the system may be practiced otherwise than as specifically described herein.

The invention claimed is:

1. A monitor device comprising:
  a projection screen that converts between an extended state where the projection screen extends substantially flat to display an image on a first side of the projection screen and on a second side of the projection screen, and a retracted state where the projection screen is retracted;
  a supporter that supports the projection screen so that the projection screen extends substantially flat when the projection screen is in the extended state;
  a storage that stores the projection screen when the projection screen is in the retracted state;
  a first projector that projects the image on the first side of the projection screen;
  a second projector that projects the image on the second side of the projection screen;
  a first user interface that receives a first operation to control the image from the first side of the projection screen;
  a second user interface that receives a second operation to control the image from the second side of the projection screen;

a switcher that switches which of the first user interface or the second user interface has a control to control the image;
a sensor that detects an object around the monitor device;
a cleaner that cleans the projection screen when the projection screen converts between the extended state and the retracted state; and
circuitry that
controls the first projector and the second projector to project the image,
corrects a first shape of the image that is projected from the first projector and a second shape of the image that is projected from the second projector,
controls the image based on the first operation when the control is assigned to the first user interface by the switcher, and the second operation when the control is assigned to the second user interface by the switcher, and
controls the image based on a detection by the sensor detected from the first side of the projection screen when the first user inter face has the control and based on a detection by the sensor detected from the second side of the projection screen when the second user inter face has the control.

2. The monitor device according to claim 1, wherein the circuitry controls the switcher to switch the control between the first user interface and the second user interface based on an input from the sensor.

3. The monitor device according to claim 2, wherein the circuitry controls the switcher to assign the control to either of the first user interface or the second user interface in front of which a face that is preregistered to the monitor device is recognized by the sensor.

4. The monitor device according to claim 1, wherein the circuitry controls the second projector to stop projecting the image based on the first operation received by the first user interface when the first user interface has the control.

5. The monitor device according to claim 1, wherein the sensor detects how much of the projection screen is extended out of the storage, and the circuitry adjusts the image based on an input from the sensor so that the image is displayed in an area of the projection screen extended out of the storage.

6. The monitor device according to claim 1, wherein the sensor detects how much of the projection screen is extended out of the storage, and the circuitry controls the first projector and the second projector based on an input from the sensor so that the image is displayed in an area of the projection screen extended out of the storage.

7. The monitor device according to claim 1, wherein the circuitry controls how much the projection screen is extended out of the storage when the projection screen is in the extended state based on an aspect ratio of the image.

8. The monitor device according to claim 1, wherein the circuitry corrects the first shape of the image and the second shape of the image by correcting data of the image input to the first projector and input to the second projector, or by controlling the first projector and the second projector to correct the image projected from the first projector and the second projector.

9. The monitor device according to claim 8, wherein the sensor detects a first position of the first projector and a second position the second projector, and the circuitry corrects the first shape of the image based on the first position and corrects the second shape of the image based on the second position.

10. The monitor device according to claim 1, wherein the image comprises a first image and a second image, and the circuitry assigns the control to both the first user interface and the second user interface when the circuitry controls the first projector to output the first image and controls the second projector to output the second image.

11. The monitor device according to claim 1, wherein the cleaner is an antiseptic material located at an outlet of the storage so that the antiseptic material contacts a surface of the projection screen when the projection screen converts between the extended state and the retracted state.

12. The monitor device according to claim 1, wherein the image comprises a first image and a second image, the sensor detects a contamination on both of the first side and the second side of the projection screen, and the circuitry controls the first projector to output the first image and controls the second projector to output the second image based on the contamination detected by the sensor so that the first image on the first side of the projection screen and the second image on the second side of the projection screen are close.

13. A method for projecting an image on a projection screen, the method comprising the steps of:
converting the projection screen from a retracted state where the projection screen is retracted to an extended state where the projection screen extends substantially flat to display an image on a first side of the projection screen and on a second side of the projection screen;
projecting the image on the first side of the projection screen by a first projector;
projecting the image on the second side of the projection screen by a second projector;
correcting a first shape of the image that is projected from the first projector and a second shape of the image that is projected from the second projector by circuitry;
controlling the image based on a first operation received by a first user interface from the first side of the projection screen and on a detection by a sensor detected from the first side of the projection screen when a control to control the image is assigned to the first user interface;
switching the control from the first user interface to a second user interface;
controlling the image based on a second operation received by the second user interface from the second side of the projection screen and on a detection by the sensor detected from the second side of the projection screen when the control is assigned to the second user interface;
converting the projection screen from the extended state to the retracted state; and
cleaning the projection screen when the projection screen converts between the extended state and the retracted state.

14. The method for projecting an image on a projection screen according to claim 13, further comprising the step of:
assigning, by the circuitry, the control to either of the first user interface or the second user interface in front of which a face that is preregistered is recognized by the sensor.

15. The method for projecting an image on a projection screen according to claim 13, further comprising the steps of:
detecting how much of the projection screen is extended out of a storage, and
adjusting the image based on the detecting so that the image is displayed in an area of the projection screen extended out of the storage.

16. The method for projecting an image on a projection screen according to claim 13, further comprising the steps of:
detecting how much of the projection screen is extended out of a storage, and controlling the first projector and the second projector based on the detecting so that the image is displayed in an area of the projection screen extended out of the storage.

17. A non-transitory computer readable medium including executable instructions, which when executed by a computer cause a computer to execute a method for projecting an image on a projection screen, the method comprising the steps of:
- converting the projection screen from a retracted state where the projection screen is retracted to an extended state where the projection screen extends substantially flat to display an image on a first side of the projection screen and a second side of the projection screen;
- projecting the image on the first side of the projection screen by a first projector;
- projecting the image on the second side of the projection screen by a second projector;
- correcting a first shape of the image that is projected from the first projector and a second shape of the image that is projected from the second projector;
- controlling the image based on a first operation received by a first user interface from the first side of the projection screen and on a detection by a sensor detected from the first side of the projection screen when a control to control the image is assigned to the first user interface;
- switching the control from the first user interface to a second user interface;
- controlling the image based on a second operation received by the second user interface from the second side of the projection screen and on a detection by the sensor detected from the second side of the projection screen when the control is assigned to the second user interface;
- converting the projection screen from the extended state to the retracted state; and
- cleaning the projection screen when the projection screen converts between the extended state and the retracted state.

18. The non-transitory computer readable medium according to claim 17, the method further comprising the step of:
- assigning, by the circuitry, the control to either the first user interface or the second user interface in front of which a face that is preregistered is recognized by the sensor.

19. The non-transitory computer readable medium according to claim 17, the method further comprising the steps of:
- detecting how much of the projection screen is extended out of a storage, and
- adjusting the image based on the detecting so that the image displayed in an area of the projection screen extended out of the storage.

20. The non-transitory computer readable medium according to claim 17, the method further comprising the steps of:
- detecting how much of the projection screen is extended out of a storage, and
- controlling the first projector and the second projector based on the detecting so that the image is displayed in an area of the projection screen extended out of the storage.

* * * * *